United States Patent
Daury et al.

[11] Patent Number: 5,922,374
[45] Date of Patent: Jul. 13, 1999

[54] TREATMENT OF VEGETABLES

[75] Inventors: Marc Cédric Daury, Epalinges; Tuong Huynh-Ba, Pully; Eric Raetz, Lausanne, all of Switzerland

[73] Assignee: Nestec S.A., Vevey, Switzerland

[21] Appl. No.: 08/760,622

[22] Filed: Dec. 4, 1996

[30] Foreign Application Priority Data

Dec. 7, 1995 [EP] European Pat. Off. ............... 95203392

[51] Int. Cl.$^6$ ........................................................ A23B 7/10
[52] U.S. Cl. ................................. 426/51; 426/49; 426/52; 426/599
[58] Field of Search ................................. 426/52, 50, 49, 426/51, 61, 590, 599, 521

[56] References Cited

U.S. PATENT DOCUMENTS 4,089,985   5/1978   Wolff ........................................ 426/487

FOREIGN PATENT DOCUMENTS 0 301 956   2/1989   European Pat. Off. .
0 482 322   5/1992   European Pat. Off. .

OTHER PUBLICATIONS

Niwa et al, Patent Abstracts of Japan, Abstracting JP 57–138370, Aug. 1982.
Lange et al., European Patent Abstracts, abstracting DE 03941555A1, Jun. 1991.
Database WPI, week 9326, Derwent Publications Japanese Abstract for JP–A–05 130 847.

*Primary Examiner*—Leslie Wong
*Attorney, Agent, or Firm*—Pennie & Edmonds LLP

[57] ABSTRACT

Process for the preparation of a vegetable juice or purée in which at least one fresh vegetable is homogenized in the presence of water, where appropriate under an inert atmosphere, so as to release the flavor precursors and part of the endogenous enzymes, the homogenate is incubated at a temperature of between 0° C. and 70° C. for 5 min to 24 h, it is processed, where appropriate, into juice or purée, and then it is pasteurized. Cooked juice or purée derived from unblanched vegetables, capable of being obtained by the process, having an enhanced raw flavor, and a natural color which is better preserved than that of the same cooked juice or purée derived from blanched vegetables. Use of a juice or purée, or of a dry extract of juice or purée in the preparation of a food product.

10 Claims, No Drawings

TREATMENT OF VEGETABLES

TECHNICAL FIELD

The subject of the present invention is a new process for the preparation of a vegetable juice or purée which makes it possible to conserve the color and the natural raw taste of these vegetables.

BACKGROUND ART

In numerous vegetable processing operations, the raw material is preconditioned at cold temperature without removal of the air, subsequent blanching then blocks the enzymatic and microbiological degradations, and the material is then processed into a final product which is frozen or heat pasteurized.

EP482322 (Societé des Produits Nestlé S.A.) describes for example a blanching of vegetables and fruits cut into small pieces for 1–15 min at 80–95° C., followed by fermentation with a lactic bacterium at 15–45° C. up to a pH of 3.1–4.4, followed by pasteurization for 2–30 min at 80–110° C.

EP111590 (Frisco-Findus A.G.) describes a process for the preparation of frozen fruits or vegetables producing a reduced volume of waste water consisting in treating the vegetables or fruits in the usual manner up to the blanching stage, in which blanching is carried out by means of steam or a mixture of steam and air, a condensate is recovered, the vegetables or fruits are cooled at least in part by means of air, they are frozen and their surface is glazed with at least part of the condensate produced during the blanching step.

FR 2,638,064 (Guillamot) describes a process for the preparation of purées, cocktails and fruit and vegetable nectars in which whole fruits and vegetables, washed but not peeled, grated or cut, are subjected to blanching and then to enzymatic reactions of 2 h to 24 h using natural proteolytic enzymes and/or enzymes chosen from galactopectases and pectin lyases. This process only makes it possible to increase the solubilization of the solids of protein and pectin origin.

The consequences of a blanching prior to the processing of the material may be unfortunately increased losses of vitamins, flavors, color and texture of the vegetables and/or fruits.

Improvements can be made to the step of blanching a vegetable. FR 2,656,547 (Cogat) thus proposes a continuous blanching apparatus which successively deaerates the material by flushing a neutral gas, heating the materials with steam, keeping the heating temperature constant, and cooling the solids under vacuum by recovering the aromatic condensates. This apparatus makes it possible to limit the oxidative enzymatic degradations during the heating, and to recover the aromatic condensates. The taste, color and texture of the vegetables are thus improved.

Likewise, EP0,124,627 (Frisco-Findus A.G.) proposes a blanching process in which the vegetables are subjected to a first blanching step at 90–100° C. for 1–30 seconds, then to a second blanching step at 45–90° C. for 1–60 min in water. The texture of the treated vegetables is firmer and the color is more intense than those of vegetables treated by conventional blanching.

In spite of all the improvements made to the blanching step, a loss of color, taste and texture of the treated vegetable and/or fruit cannot be avoided.

To overcome this problem, the negative effects of a pasteurization, and the bad natural taste of a juice of sea buckthorn berry (*Hyppophae rhamnoides*), DE 3,941,555 (VE Forschungsinstitut fur Obst- und Gemüseverarbeitung) proposes disinfecting, with alcohol, fresh sea buckthorn berries and fresh fruits, the fruits preferably having intense flavors, sterilely preparing a mixture of purée of disinfected sea buckthorn berries comprising, in addition, 3–10% of a purée of disinfected fruits or of a juice derived from the fruits, and then preserving it without the presence of air for 24 hours to 6 months at 10–30° C. Blanching of the fruits and of the berries is thus avoided by virtue of the disinfection by the alcohol. A final pasteurization of the mixture is also avoided by virtue of the disinfection and of the acidic pH of the mixture. Finally, it can be noted that the natural "whey" taste of the berries is modified by the enzymes and the flavors of the fruits added.

The present invention aims to avoid a vegetable blanching step, and especially to use the endogenous enzymes of the vegetables to enhance their natural raw flavor and/or taste, as well as their natural color during their processing into juice or purée.

SUMMARY OF THE INVENTION

To this end, in the process for the preparation of a vegetable juice or purée according to the invention, at least one vegetable material is homogenized in the presence of water, where appropriate under an inert atmosphere, so as to release part of the flavor precursors and the endogenous enzymes, the homogenate is incubated at a temperature of between 0° C. and 70° C. for 5 min to 24 h, it is processed, where appropriate, into juice or purée, and then it is pasteurized.

The invention also relates to a cooked juice or purée derived from unblanched vegetables, which is capable of being obtained by the process according to the invention, having an enhanced raw natural flavor, and a natural color which is better preserved than that of the same cooked juice or purée derived from blanched vegetables.

The invention also relates to the use of the products according to the invention in the preparation of a food product.

It has been observed that the conventional step of blanching vegetables can be advantageously eliminated without adversely affecting the organoleptic or textural qualities of the final product. It is in fact not always necessary to disinfect the vegetables beforehand, it being possible for a simple washing with water to be perfectly acceptable. It can be stated that this elimination runs counter to the general principles accepted in the processing of vegetables, because the blanching step usually makes it possible to block enzymatic and microbiological degradations.

Moreover, the process according to the invention also makes it possible to enhance the natural fibrous texture of the purée.

Surprisingly, it is possible to preserve the color and substantially enhance the natural raw and fresh flavor and taste of the vegetables by releasing, by mechanical grinding, the flavor precursors and the endogenous enzymes of the vegetables. However, in most cases, care should be taken to homogenize and incubate the vegetable under an inert atmosphere in order to prevent oxidation reactions which are damaging to the color and taste. It can be noted that DE 3,941,555 mentioned above aims to transform the taste of sea buckthorn berries by adding highly aromatic fruits, whereas the present invention aims only to enhance the taste and the natural flavor of the vegetables without adding an additional agent.

DETAILED DESCRIPTION OF THE INVENTION

The term "pasteurization" is understood to mean an inactivation or the suspension of the growth cycle of all vegetative microbes, for example by means of heat, pressure and/or freezing. Likewise, the term "sterilization" is understood to mean an inactivation of all microbes including the heat-resistant bacterial endospores. For the sake of simplicity, it will be considered that pasteurized products include sterilized products.

The term "juice" is understood to mean an aqueous solution derived from vegetables, for example by pressing or by decoction, which may in addition comprise a certain proportion of concentrate from vegetables, citrus fruits, fruits or mixtures of natural fruit concentrates as well as a certain proportion of various sweetening products, nutritive products and/or products supplying essential nutrients. The term "juice" may also be designated by the common terms "nectar" or "cocktail".

The term "purée" is understood to mean crushed or homogenized cooked vegetables having a consistency allowing their consumption using a fork for example. The term "purée" may also commonly designate slurries, mousselines, compotes and vegetable creams.

The term "blanching" is understood to mean the initial step of thermal treatment of whole fruits and/or vegetables or pieces, which is generally performed using steam or hot water for example and intended to block enzymatic degradations and microbial development. For further details, the teachings of EP111590 and EP124627 are incorporated by reference.

The expression "fresh or raw flavor" is understood stood to mean the mouth taste and/or the flavor to the nose of a purée or of a juice according to the invention which is similar, or even identical, to those of an uncooked purée or juice derived from unblanched vegetables. "Enhanced raw flavor" is understood to mean a raw taste in the mouth and/or flavor in the nose of the cooked purées and juices according to the invention, which are more intense than those of the cooked purées or juices derived conventionally from blanched or unblanched vegetables.

To carry out the present process, fruits and/or vegetables can be used as vegetable material, that is to say any edible vegetable, whether it is a seed, root, tuber, stem, leaf, flower or fruit for example. Vegetables for which it is desired to enhance the natural fresh taste are, however, preferably used. Vegetables whose natural taste may be unpleasant and whose cooked taste is desired, especially asparagus, peas, soya bean, potato, cereals, sea buckthorn berry, and medlar for example, will thus be avoided in particular. Among the preferred vegetables, there may be distinguished more particularly leaves, especially leek, fennel and cabbage, stems, especially rhubarb and broccoli, some roots, especially carrot, onion, radish, celery and beet, tubers, especially cassava, and fruits, especially tomato, courgette, aubergine, banana, apple, apricot, melon, water melon, pear, plum, peach, cherry, kiwi and mirabelle for example.

It is also possible to use, as vegetables, edible higher fungi which may be considered to be included among the vegetables, especially *Agaricus bisporus, Pleurotus ostreatus, Boletus edulis* or *Lentinus edodes*, for example.

Preferably, at least one vegetable is thoroughly washed with water, where appropriate it is peeled and it is cut into pieces if it is of a relatively large size. For vegetables which are particularly microbiologically contaminated, such as for example strawberries, it is also possible to disinfect them in an alcohol solution, especially a solution of 70% ethanol for example.

The vegetables are then homogenized in the presence of water, and where appropriate under an inert atmosphere. For that, the water, salt and vegetables can be placed in a grinder having a closed chamber in which circulates an inert gas which can be used in food processes, especially $CO_2$, nitrogen, argon, helium, alone or as a mixture for example. It is advantageous to have an inert gas atmosphere having an oxygen partial pressure of less than 0.05 atm for example.

Preferably, a quantity of water is added to the vegetables such that the homogenized mixture comprises less than 50% by weight of dry vegetable matter, especially less than 40% by weight of dry matter, for example between 20% and 40%. It is possible already at this stage to add ingredients such as salts, spices, preservatives, thickeners and, bacteriostatic agents, for example.

The degree of grinding of the vegetables depends on the final product which it is desired to obtain. For a purée, the vegetables can be finely divided, whereas for a purée having a coarse texture, that is to say a compote, it is possible to be limited to a coarser grinding which leaves the vegetable fibers apparent. However, it is preferable to carry out sufficient grinding so that at least 20% by fresh weight of the vegetables is completely ground and reduced to a slurry, preferably 30%. A sufficient quantity of enzymes and of flavor precursors is thus released so that the raw natural flavor of the vegetables can be substantially enhanced.

The homogeneity is then incubated at a temperature of between 0° C. and 70° C. for 5 min to 24 h, preferably at 20–50° C. for 15 to 120 min. It is also preferable to incubate the homogenate under an inert gas atmosphere so as to reduce its oxidation. The incubation temperature and time depend on the type of vegetable and on their degree of grinding. In general, the more rapidly the vegetables are treated after their harvest, that is to say the fresher they are, or the more extensive their grinding, the lesser the need to prolong the incubation time. It is in fact within the competence of a person skilled in the art to routinely determine, for each vegetable, depending on its freshness, the degree of grinding, the incubation period and the incubation temperature which are preferred.

Depending on the time and duration of incubation, and the level of carbohydrates and microbiological contamination of the vegetables, it may be necessary to add to the homogenate bacteriostatic agents such as for example the bacteriocins described in EP 95810497.8 and WO 94/02805.

The homogenate can then be directly processed into juice or purée by methods known to a person skilled in the art. To prepare a juice, the homogenate can be pressed, the juice separated and, where appropriate, the juice decanted off for example. On the other hand, the purée may already have the correct consistency by virtue of the prior homogenization of the vegetables and/or fruits. Other ingredients can then be directly added such as salts such as 0.15–0.35% each of NaCl, preservatives, sugars such as honey, sweeteners such as aspartame or acesulfame, including polyols such as xylitol, aromatic extracts, yeast extracts, vitamins, alcohols, and thickening agents such as starch or carboxymethylcellulose for example.

Some vegetable juices or purées are quite suitable able for consumption when they are raw, that is to say when they are not treated at temperatures greater than 70° C. Among these products, there may be distinguished the juices and purées of broccolis, carrots or strawberries, for example. It can thus be envisaged freezing the juice or purée obtained by the process according to the invention, where appropriate under an inert atmosphere or under vacuum, for example at a temperature of between −25° C. and −50° C., especially between −30° C. and −40° C. Preferably, the product is cooled to a temperature of +2° C. to −5° C. while being intimately mixed with a quantity of between about 20% and 80% by weight of a frozen juice or purée according to the invention.

Instead of freezing the products, the microbial load can also be reduced without the products being cooked, by subjecting them to a pressure greater than 300 MPa, preferably greater than 500 MPa, for 1 to 30 min at a temperature of between −5° C. and 70° C., for example. To pasteurize at a higher pressure, the juice or purée can be isolated from the liquid used to transmit the high pressure, for example water or oil, by packaging means especially in deformable plastic or aluminium containers for example. These containers may then be placed in a chamber of a high pressure device, for example a suitable autoclave, in which the treatment is applied at high pressure for a suitable time and at a suitable temperature in order to obtain pasteurization without cooking. The treatment time begins from the moment the desired pressure and temperature are reached, the time necessary to reach these values being on average of the order of 1 min for example. It can be envisaged bringing the juice or the purée by means of appropriate conduits into a chamber of a high-pressure device, for example a suitable autoclave, in which the desired pressure and temperature will be applied for example.

On the other hand, other vegetable juices or purées are better suitable for consumption when they are cooked, that is to say when they are treated at temperatures greater than 70° C. in order to establish cooking. If a cooked product is desired, the juice or purée obtained can then be thermally treated by the process according to the invention for 2–30 min at 70–125° C. for example. If a treatment is carried out for less than 2 min or at less than 70° C. or 80° C., there is a risk of not meeting the conditions necessary for the inactivation of the spores of sporulating microorganisms and for the inactivation of vegetative cells. If the treatment is carried out for more than 30 min or at more than 125° C., there is a risk of excessively softening the texture of the purée and of destroying some labile flavors.

In the specific case of vegetables and/or fruits comprising leucanthocyanidine pigments, such as bananas, pears, apples, cabbages, cauliflowers and onions for example, it can be recommended, before the heat treatment step, to add to the juice or to the purée at least 2% by weight of proteins derived from meat, eggs, animal tissues or soya bean for example. The appearance of a reddish color during the heat pasteurization step can thus be avoided. For more details, the teaching of EP191311 is incorporated by reference.

The microbial load can thus be reduced while cooking the products moderately, by subjecting them to a pressure greater than 300 MPa, preferably greater than 500 MPa, for 1 to 30 min at a temperature of between 70° C. and 125° C., preferably between 70° C. and 90° C.

In a first specific embodiment of the present invention, fresh fruits and/or vegetables are homogenized in the presence of water under an inert atmosphere so as to release part of the endogenous enzymes, the homogenate is incubated at a temperature of between 0° C. and 70° C. for 5 min to 24 h, it is processed into juice or purée, it is fermented by a lactic bacterium at 15–45° C. up to a pH of 3.1–4.5, then it is pasteurized.

The lactic bacterium, in other words a lactic acid-producing bacterium, may be chosen from the commercial strains commonly used for the preparation of fermented products such as a salami, a sauerkraut, or a yogurt, for example. A strain of *Lactobacillus plantarum, Leuconostoc mesenteroides* or *Lactobacillus brevis* may be used in particular and the fermentation may be carried out at a temperature of about 20–35° C. for example. It is also possible to use a strain of *Streptococcus thermophilus* and *Lactobacillus bulgaricus*, to add to the medium up to 2% lactose and to carry out the fermentation at 35–45° C. In particular, up to 2% sucrose or glucose is added to the vegetable and/or fruit juice or purée when it is relatively low in fermentable sugar. It may also prove necessary, depending on the degree of contamination of the mixture, to carry out a pasteurization of the juice or of the purée before fermenting it using a lactic bacterium.

In another specific embodiment of the present invention, fresh fruits and/or vegetables are homogenized in the presence of water under an inert atmosphere so as to release part of the endogenous enzymes, the homogenate is incubated at a temperature of between 0° C. and 70° C. for 5 min to 24 h, it is processed into juice, where appropriate it is pasteurized and then it is concentrated or even dried.

The juice or a liquid extract of a purée according to the invention can thus be concentrated by evaporation under vacuum, distillation or ultrafiltration for example. The concentrate may be pasteurized or spray-dried or freeze-dried for example. A water-soluble powder with enhanced fresh flavor can thus be obtained.

In a variant of the process, volatile flavors recovered by condensation during the evaporation or distillation step are added to the concentrate and the mixture obtained is dried, where appropriate after addition of a water-soluble carrier, such as maltodextrins. Preferably, the final powder comprises at least 10% by weight of dried vegetable extract relative to the weight of the water-soluble support.

Finally, the products according to the invention may be preserved in a suitable sterile storage packaging. It is observed that the product has a taste and a color which are similar to the taste and color of the vegetables and/or fruits used. Furthermore, the product does not lose any of its qualities after a storage of several months or even one year at room temperature.

The invention therefore relates to the new cooked juices or purées, derived from unblanched vegetables, which are capable of being obtained by the present process, and which have an enhanced raw natural flavor, and a natural color which is better preserved than that of the same cooked juices or purses derived from blanched vegetables.

Preferably, the invention relates to the new cooked juices or purées derived from unblanched vegetables, which are capable of being obtained by the present process, having an enhanced raw flavor, having CIELAB (CIE, colorimetry, 2nd edition, CIE Publication, No. 15.2, Central Bureau of the International Commission on Illumination, Vienna, Austria) shade parameters a* and b* of between 70% and 130% of those of the same juices or purées unblanched and uncooked, preferably of between 80% and 120%, and having a CIELAB clarity parameter L* greater than 70% of that of the same juices or purées unblanched and uncooked, preferably greater than 85%.

In particular, it can be noted that at least one of the CIELAB parameters of the products according to the invention is greater by a factor of 1.1 than that of the same juices and purées derived from blanched and cooked vegetables.

In particular, the invention relates to the new cooked juices or purses derived from unblanched carrots, capable of being obtained by the present process, having at least 3 times more 3-isobutyl-2-methoxypyrazine, beta-ionone, and 1-octen-3-ol compared with a cooked juice or purée derived from blanched carrots.

EXAMPLES

The present invention is described in greater detail below with the aid of the additional description which follows, which refers to examples of manufacture of fruit and vegetable juices and purées. The percentages are given by weight unless otherwise stated. It goes without saying, however, that these examples are given by way of illustration of the subject of the invention and do not constitute in any manner a limitation thereto.

Example 1

Fresh carrots are washed with water, peeled, rinsed with water, and cut into small pieces. A volume of pieces (300 g) are homogenized, at room temperature and in the absence of air by virtue of a nitrogen stream, in a grinder in the presence of another volume of water and of 0.25% NaCl. The homogenization is carried out for 4 min until a carrot purée is obtained. The carrot purée is then incubated at 38° C. for 60 min, and then it is directly sterilized at 121° C. for 15 min in an autoclave (type FVS/2/2000, Integra Biosciences, Switzerland).

For comparison, fresh carrots are washed with water, peeled, rinsed with water, cut into small pieces, and blanched in boiling water for 20 min. A volume of blanched pieces is homogenized, at room temperature, in a grinder in the presence of another volume of water and of 0.25% NaCl. The homogenization is carried out for 4 min until a carrot purée is obtained, and then it is directly sterilized at 121° C. for 15 min in an autoclave (type FVS/2/2000, Integra Biosciences, Switzerland).

A portion of the sterilized purées is subjected directly to a sensory evaluation, while another portion is preserved at room temperature for 20 days for subsequent sensory analysis. The sensory evaluation is carried out by a group of 15 persons who are invited to taste 3 samples of each carrot purée which are maintained at a temperature of 40° C., and to differentiate them by assessing only their flavor and taste properties.

100% of the tasters easily differentiated the blanched carrot purée (conventional process) from that obtained by the process according to the invention. The sensory consents are presented in Table 1 below, as well as the respective texture and color of the purées.

TABLE 1

|                       | Invention   | Conventional process |
| --------------------- | ----------- | -------------------- |
| Fresh carrot flavor   | present     | a little             |
| Cooked carrot flavor  | a little    | present              |
| Smoothness in the mouth | present   | a little             |
| Bad taste             | absent      | a few                |
| Bitterness            | a little    | present              |
| Earthy note           | a little    | absent               |
| Color                 | orange-red  | brown-orange         |
| Texture               | fibrous     | slurry               |

All the tasters noted the fresh carrot flavor, the fibrous texture and the perfect orange-red color developed by the process according to the invention. On the other hand, the blanched carrot purée is characterized by cooking flavors, some bitterness, a smooth texture and a slightly brown color. The purée according to the invention is preferred by 67% of the tasters, whereas 33% do not like the flavor developed by the new process or were surprised by the fresh carrot flavor.

Furthermore, GC-FID and GC-sniffing (combination of gas chromatography and olfactometry) chromatography analysis of the volatiles of the carrot purées obtained by different processes shows that the process according to the invention provides the purée with 4 to 5 times more volatile compounds compared with the purée obtained by a conventional process. Three different compounds thus contribute to the raw and fresh organoleptic note of the carrot purée, namely 3-isobutyl-2-methoxypyrazine, beta-ionone and 1-octen-3-ol.

The purées obtained by the process according to the invention and by the conventional process, which were preserved for 20 days at room temperature, have the same characteristics as those analysed directly after their preparation. The fresh carrot flavor, the fibrous texture and the orange-red color of the purées according to the invention can therefore be preserved for a prolonged period of time.

Examples 2–5

The examples are aimed at comparing the color and the taste of strawberry, banana, carrot and broccoli purées, according to the type of treatment used. Each vegetable and each fruit is prepared separately according to the type of treatment. In all cases, the vegetables and fruits are washed with water, drained and cut into pieces. The carrot is peeled beforehand.

The vegetables and fruits are homogenized in a Waring Blender® (Waring Product Dynamics Corporation of Am., New Hardford, Conn., USA) metallic container in the presence of distilled water in a 1:1 ratio for 3 to 5 min, under an inert atmosphere and at room temperature. The purée obtained is transferred into glass pots of 100 g, filled to the brim. The pots are placed in a water bath at 37° C. for 60 min. The incubation is carried out under an inert gas or in the absence of air. The endogenous enzymatic reactions are stopped by sterilization in an autoclave for 15 min at 121° C. The pots are then stored at 4° C.

In the specific case of broccolis, a nonsterilized broccoli purée is prepared in parallel. For that, broccoli pieces are homogenized under the same conditions and in the same proportions as those described above, the purée is transferred into vacuum-sealed plastic sachets and it is then incubated at 37° C. for 60 min and then frozen in liquid nitrogen before being stored at −20° C.

For comparison, blanched vegetable and fruit purées are prepared. For that, the vegetable or fruit pieces are blanched in a boiling water bath for 20 min. The pieces are then homogenized in a Waring Blenders® metallic container in the presence of distilled water in a 1:1 ratio for 3 to 5 min. The purée obtained is transferred into glass pots of 100 g, filled to the brim. All the pots and their contents are sterilized in an autoclave for 15 min at 121° C.

In the specific case of broccolis, a nonsterilized blanched broccoli purée is prepared in parallel. For that, broccoli pieces are blanched and homogenized under the same conditions and in the same proportions as those described above. The purée is transferred into vacuum-sealed plastic sachets and it is then frozen in liquid nitrogen before being stored at −20° C.

To allow comparison of the shades and brightness of the color of the purées prepared, a reference color is obtained by homogenizing the vegetables and the fruits in a Waring Blender® metallic container in the presence of distilled water in a 1:1 ratio for 3 to 5 min, under an inert atmosphere at room temperature. The purée obtained is transferred into a plastic sachet which is plunged into liquid nitrogen and then stored at −20° C.

To measure the color of the samples, each sample of purée is heated to room temperature, a portion is removed and placed in small plastic Petri dishes intended for calorimetric analysis with a Color-Eye-7000® spectrophotometer (Macbeth, Division of Kollmorgen Instruments Corporation, New Windsor, N.Y., USA). This apparatus makes it possible to measure the parameters L*, a* and b*,. according to the CIELAB notation (see also F. J. Francis et al., Food colorimetry: theory and applications, AVI Publishing Company, Inc., Westport, Va., USA), which characterize the shades and the brightness. The red, yellow, green and blue shades form a color wheel placed in a plane a* and b*. The parameter L* defines the brightness of the colors which varies vertically in the plane a* and b*. Each value L*, a* and b* obtained for each purée sample results from the mean of 3 separate measurements.

To evaluate the taste of the purées, a sensory evaluation is carried out by a group of 5 persons, as described in Example 1.

The results presented in Table 2 below show that the color drift is limited in the purées incubated under an inert atmosphere, and this particularly for the strawberry, banana and carrot purées. In all cases, the incubation under an inert atmosphere also makes it possible to obtain a natural taste and flavor. The advantage of preserving the broccoli purées by freezing can be noted.

TABLE 2

| Fruit and vegetable (Examples 2–5) | Color observed | Color measured L* | a* | b* | Taste |
|---|---|---|---|---|---|
| Example 2: strawberry | | | | | |
| Control | pinkish red | 32.69 | 30.97 | 18.89 | |
| Incubation/sterilization | red | 25.06 | 26.05 | 13.01 | persistent strawberry flavor |
| Blanching/sterilization | dark red | 22.24 | 20.01 | 9.89 | cooked bland taste |
| Example 3: banana | | | | | |
| Control | yellow | 60.40 | 4.07 | 23.16 | |
| Incubation/sterilization | brown | 53.04 | 4.98 | 13.78 | persistent raw banana taste |
| Blanching/sterilization | chestnut | 45.60 | 5.71 | 10.71 | fermented sweet weak taste |
| Example 4: carrot | | | | | |
| Control | vivid orange | 46.02 | 23.94 | 36.59 | |
| Incubation/sterilization | vivid orange | 41.43 | 29.45 | 39.25 | identical to TABLE 1 |
| Blanching/sterilization | brown orange | 37.37 | 16.04 | 31.04 | identical to TABLE 1 |
| Example 5: broccoli | | | | | |
| Control | light green | 44.09 | −12.29 | 31.38 | |
| Incubation/freezing | light green | 48.42 | −11.76 | 32.21 | intense green taste and flavor |
| Blanching/freezing | brown-green | 46.52 | −2.11 | 27.80 | cooked taste and flavor |
| Incubation/sterilization | yellow-green | 51.19 | −0.34 | 32.89 | cooked taste and flavor, raw note |
| Blanching/sterilization | brown-green | 45.16 | 0.89 | 28.67 | cooked flavor + sulphury and cooked sweet taste |

Table 3 below presents the percentage variation of the a*, b* and L* parameters relative to those of the controls.

In all cases, the brightness index L* of the unblanched cooked products is closer to the control value than that obtained from the cooked and blanched products.

The preferred products have CIELAB color parameters a* and b* of between 70% and 130%, and a CIELAB brightness parameter L* greater than 70% relative to that of the same juices or purées which are unblanched and uncooked.

TABLE 3

| Fruit and vegetable (Examples 2–6) | Color measured | | | | | |
|---|---|---|---|---|---|---|
| | L* | L*% | a* | a*% | b* | b*% |
| Example 2: strawberry | | | | | | |
| Control | 32.69 | | 30.97 | | 18.89 | |
| Incubation/sterilization | 25.06 | 76 | 26.05 | 84 | 13.01 | 68 |
| Blanching/sterilization | 22.24 | 68 | 20.01 | 64 | 9.89 | 52 |
| Example 3: banana | | | | | | |
| Control | 60.40 | | 4.07 | | 23.16 | |
| Incubation/sterilization | 53.04 | 87 | 4.98 | 122 | 13.78 | 59 |
| Blanching/sterilization | 45.60 | 75 | 5.71 | 140 | 10.71 | 46 |
| Example 4: carrot | | | | | | |
| Control | 46.02 | | 23.94 | | 36.59 | |
| Incubation/sterilization | 41.43 | 90 | 29.45 | 123 | 39.25 | 107 |
| Blanching/sterilization | 37.37 | 81 | 16.04 | 67 | 31.04 | 94 |
| Example 5: broccoli | | | | | | |
| Control | 44.09 | | −12.29 | | 31.38 | |
| Incubation/freezing | 48.42 | 109 | −11.76 | 95 | 32.21 | 102 |
| Blanching/freezing | 46.52 | 105 | −2.11 | 17 | 27.80 | 88 |
| Incubation/sterilization | 51.19 | 116 | −0.34 | 3 | 32.89 | 104 |
| Blanching/sterilization | 45.16 | 102 | 0.89 | — | 28.67 | 91 |

Example 6

A carrot purée is prepared as described in Example 1, the only difference being that it is pasteurized at a high hydrostatic pressure. For that, the purée is distributed into sterile plastic sachets resistant to the high pressure, they are sealed without air bubbles and they are subjected to a hydrostatic pressure of 800 MPa for 20 min at 30° C. using a press (ABB GmbH, Switzerland). The purées can then be preserved for at least 6 months at room temperature, without observing flavor, texture and color modifications.

Example 7

A carrot juice is prepared according to the invention. For that, fresh carrots are washed with water, they are peeled, they are rinsed and they are cut into small pieces. A volume of pieces is then homogenized, at room temperature and in the absence of air by virtue of a nitrogen stream, in a grinder in the presence of 2 other volumes of water and of 0.25% NaCl. The homogenization is carried out for 4 min until a carrot purée is obtained. The mixture is then incubated at 38° C. for 120 min, it is pressed through a filter having a porosity of 100 μm, the juice is isolated and it is then sterilized at 121° C. for 15 min in an autoclave (type FVS/2/2000, Integra Biosciences, Switzerland).

Example 8

A tomato juice is prepared according to the invention. For that, fresh tomatoes are washed with water, they are homogenized at room temperature and in the absence of air by virtue of a $CO_2$ stream, in a grinder in the presence of 1.5 volumes of water and of 0.25% NaCl. The homogenization is carried out for 5 min until a liquid tomato slurry is obtained. The mixture is then incubated at 36° C. for 100 min, it is pressed through a membrane having a porosity of 100 μm, the juice is isolated and then it is pasteurized at 80° C. for 15 min in an autoclave.

For comparison, fresh tomatoes are washed with water, they are cut into pieces and they are blanched in boiling water for 20 min. A volume of blanched tomatoes is homogenized, at room temperature, in a grinder in the presence of 1.5 volumes of water and of 0.25% NaCl. The homogenization is carried out for 5 min until a liquid tomato slurry is obtained, it is pressed through a membrane having a porosity of 100 μm, the juice is isolated and then it is pasteurized directly at 121° C. for 15 min in an autoclave.

The tasters can easily differentiate the flavor of fresh tomato and the intense red color of the tomato juice according to the invention compared with those obtained with the blanched tomato juice.

Example 9

The strawberry and banana purées of Examples 2 and 3 are mixed, the mixture is fermented by the *Streptococcus thermophilus* CNCM I-1424 strain up to a pH of 4.5, then it is sterilized at 121° C. for 15 min in an autoclave.

Example 10

A liquid fraction is extracted from the carrot purée of Example 1, it is concentrated by evaporation under vacuum, it is pasteurized for 5 min at 121° C., the volatile flavors recovered by condensation during the concentration step are added and it is freeze-dried after addition of maltodextrin so as to obtain a powder containing 10% by weight of dried carrot fraction.

The powder thus obtained is easily dispersible in a liquid medium, conferring on it an enhanced raw carrot flavor.

What is claimed is:

1. A process for the preparation of a vegetable juice or purée comprising the steps of:

homogenizing at least one vegetable material in the presence of water without blanching the vegetable material so as to release but not remove part of the flavor precursors and part of the endogenous enzymes of the vegetable material to form a homogenate that contains the released flavor precursors and enzymes;

incubating the homogenate at a temperature of between 0° C. and 70° C. for 5 minutes to 24 hours to enhance the natural raw flavor of the vegetable material;

processing the homogenate into juice or purée; and pasteurizing the juice or purée.

2. Process according to claim 1, in which the vegetable material is chosen, alone or in combination, from the group of edible vegetables formed by fruits and vegetables consisting of seeds, roots, tubers, stems, leaves and flowers.

3. Process according to claim 1, in which sufficient grinding is provided so that at least 20% by fresh weight of the vegetables is completely ground.

4. Process according to claim 1, in which the homogenate is incubated under an inert atmosphere.

5. Process according to claim 1, in which the homogenate comprises less than 50% by weight of dry vegetable matter.

6. Process according to claim 1, in which the juice or purée is pasteurized for 2–30 min at 70–125° C. or at least 300 MPa for 1 to 30 min at a temperature of between –5° C. and 70° C.

7. Process according to claim 1, in which the juice or purée is fermented by a lactic bacterium at 14–45° C. up to a pH of 3.1–4.5.

8. A process according to claim 1, in which the juice or purée is dried after addition of a water-soluble base.

9. A process according to claim 1, in which the vegetable material is homogenized under an inert atmosphere.

10. A process according to claim 1, in which the vegetable material is homogenized at room temperature.

* * * * *